United States Patent [19]

Wine

[11] Patent Number: 4,631,585
[45] Date of Patent: Dec. 23, 1986

[54] APPARATUS FOR SYNCHRONIZING THE OPERATION OF A MICROPROCESSOR WITH A TELEVISION SYNCHRONIZATION SIGNAL USEFUL IN GENERATING AN ON-SCREEN CHARACTER DISPLAY

[75] Inventor: Charles M. Wine, Mercer County, N.J.

[73] Assignee: RCA Corporation, Princeton, N.J.

[21] Appl. No.: 607,595

[22] Filed: May 7, 1984

[51] Int. Cl.⁴ .............................................. H04N 5/04
[52] U.S. Cl. .................................... 358/148; 358/149; 358/192.1; 340/814; 324/79 D; 328/110; 307/510
[58] Field of Search ............ 358/148, 149, 158, 192.1; 340/721, 748, 750, 814; 324/79 D, 83 D; 328/110, 72; 307/510, 519, 269

[56] References Cited

U.S. PATENT DOCUMENTS

| | | | |
|---|---|---|---|
| 4,081,797 | 3/1978 | Olson | 340/324 |
| 4,227,217 | 10/1980 | Balaban et al. | 358/192.1 |
| 4,281,345 | 7/1981 | Warn | 358/149 |
| 4,346,407 | 8/1982 | Baer et al. | 358/149 |
| 4,450,442 | 5/1984 | Tanaka | 340/814 |
| 4,464,679 | 8/1984 | Wargo | 358/148 |
| 4,527,194 | 7/1985 | Sirazi | 358/192.1 |

FOREIGN PATENT DOCUMENTS

| | | |
|---|---|---|
| 0096628 | 12/1983 | European Pat. Off. |
| 0103982 | 3/1984 | European Pat. Off. |
| 2513041 | 3/1983 | France |
| 56-94841 | 7/1981 | Japan |
| 2105139A | 3/1983 | United Kingdom |

OTHER PUBLICATIONS

A product description entitled "An Introduction to the MB88303 Television Display Controller" published by Fujitsu Limited of Japan in Sep., 1982.

Primary Examiner—James J. Groody
Assistant Examiner—Michael D. Parker
Attorney, Agent, or Firm—Eugene M. Whitacre; Paul J. Rasmussen; Peter M. Emanuel

[57] ABSTRACT

A microprocessor embodied in an integrated circuit has a clock signal generator comprising an inverter in the integrated circuit and a frequency determining network external to the integrated circuit connected to the inverter through terminals. The clock signal generator generates a clock signal which determines the frequency of the instruction cycles of the microprocessor. The operation of the microprocessor is synchronized with a television horizontal rate signal by programming it to generate a comparison signal each time a predetermined number of instruction cycles, selected so that the comparison signal has the same nominal frequency as the horizontal rate signal have occurred. The simple wired AND gate serves as coincidence detector for the horizontal rate signal and the comparison signal and generates a pulse error signal representing the phase and frequency deviations between its two input signals. The error signal is filtered and coupled to the inverter to control the phase and frequency of the clock signal. This microprocessor synchronization arrangement is used to form characters on the screen of a picture tube without the need of an additional character generator.

23 Claims, 11 Drawing Figures

FORMAT DOT BITS FOR CHARACTERS

APPARATUS FOR SYNCHRONIZING THE OPERATION OF A MICROPROCESSOR WITH A TELEVISION SYNCHRONIZATION SIGNAL USEFUL IN GENERATING AN ON-SCREEN CHARACTER DISPLAY

FIELD OF THE INVENTION

The present invention concerns apparatus for synchronizing the operation of a computing system such a microprocessor or microcomputer with a reference signal such as a television synchronization signal.

BACKGROUND OF THE INVENTION

In order for a microprocessor or microcomputer (the terms are commonly used interchangeably) to perform real time processing of television signals it is desirable to synchronize its operation to a synchronization component of the video signal. A method and apparatus for this purpose is described in U.S. patent application Ser. No. 280,475 entitled "Method and Apparatus for Operating a Microprocessor in Synchronism with a Video Signal" filed on July 6, 1981 in the name of R. A. Wargo and assigned to the same assignee as the present invention which application is now issued as U.S. Pat. No. 4,464,679. The disclosed apparatus includes a phase locked loop which locks the frequency of a voltage controlled oscillator (VCO) external to the integrated circuit embodying the microprocessor to the frequency of a horizontal rate signal. The output signal of the VCO is coupled to the clock input of the microprocessor through a gate controlled by the microprocessor. The clock signal received by the microprocessor determines when the instructions of the programs which control its operation occur. The microprocessor is programmed to execute instructions for periodically sampling the composite video signal to determine the position of synchronization component and to operate the gate to delete clock pulses until the occurrence of the sampling instruction is aligned in phase with the occurrence of synchronization component.

SUMMARY OF THE INVENTION

The present invention is directed to a very simple apparatus for synchronizing the operation of a computing system such as a microprocessor with a synchronization signal which can be implemented using relatively few parts external to the integrated circuit in which the microprocessor is embodied.

Specifically, in accordance with an aspect of the present invention, a clock generator, which generates a clock signal for the computing system, preferably comprises an amplifying device such as an inverter included within the same integrated circuit in which the computing system is embodied and a frequency determining network external to the integrated circuit and coupled to the amplifying devices through terminals. The clock signal determines the timing of the instruction cycles of the computing system and thereby the timing of the occurrence of the instructions which control its operation. The computing system is programmed to generate a comparison signal each time a predetermined number of instruction cycles have occurred. The predetermined number of instruction cyclces is selected in conjunction with the frequency of the clock signal so that the frequency of the comparison signal is nominally the same as that of the synchronization signal to which the operation of the computing system is to be synchronized. A comparator compares both the phase and frequency of the comparison signal with that of a synchronization signal to generate a control signal which is coupled to the clock generator to control both its frequency and phase.

In accordance with another aspect of the present invention, it is recognized that the above-described arrangement is particularly well suited for generating an on-screen character display for a television system without the need for an additional character generator.

These and other features of the present invention will be described with reference to the accompanying Drawing in which:

DETAILED DESCRIPTION

Figure 1:
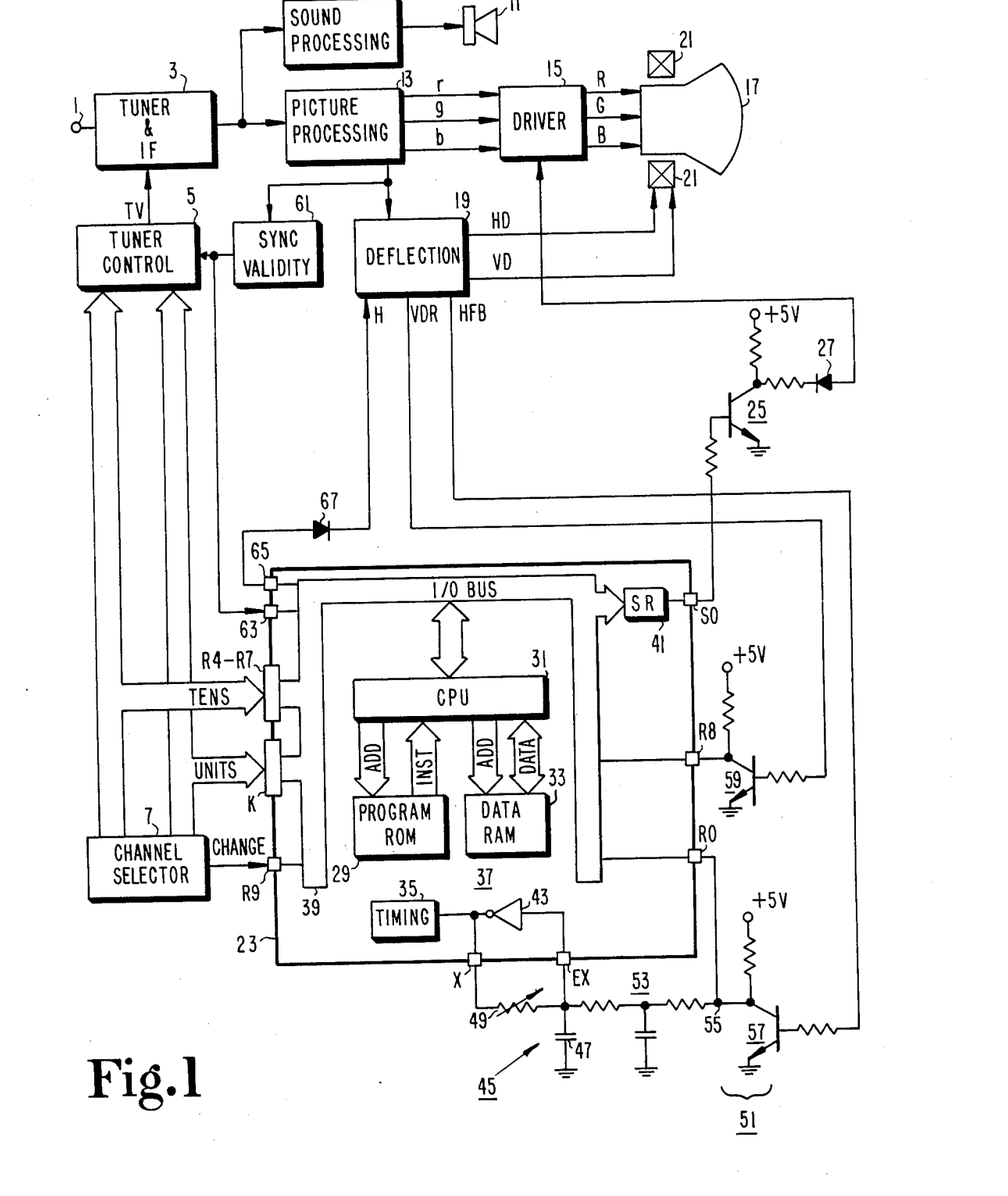
FIG. 1 is partly a block and partly a schematic diagram of a television receiver employing a microprocessor and apparatus for synchronizing its operation to horizontal and vertical rate signals in accordance with the present invention for the purpose of displaying channel numbers on the screen of the receiver.

In the television receiver shown in FIG. 1, RF television signals received at an RF input 1 are coupled to a tuner and IF section 3 which selects and heterodynes the RF signal corresponding to a selected channel to produce a corresponding IF signal. The tuner of tuner and IF section 3 is a voltage controlled tuner and is controlled in response to the magnitude of a tuning voltage (TV) generated by a tuner control unit 5 in accordance with the selected channel determined by a channel selector 7.

The sound component of the IF signal is coupled to a sound processing unit 9 which demodulates and otherwise processes it to produce a baseband audio signal suitable for application to a speaker 11. The picture component of the IF signal is coupled to a picture processing unit 13 which demodulates and otherwise processes it to produce low level red, green and blue (r, g and b) color signals. The low level color signals are amplified by respective drivers in a driver section 15 and the resultant signals (R, G and B) are coupled to respective electron guns of a picture tube 17 which in response generates corresponding electron beams.

A composite synchronization signal, including horizontal and vertical synchronization components, produced by picture processing unit 13, is coupled to a deflection unit 19 which generates horizontal and vertical deflection signals (HD and VD). The deflection signals are coupled to deflection coils 21 associated with picture tube 17 to deflect its electron beams in a raster.

Horizontal rate retrace or "flyback" (HFB) pulses and vertical rate drive (VDR) pulses generated in connection with the generation of the deflection signals are utilized to synchronize the operation of a microprocessor as will be described in detail below.

The portions of the television receiver so far described are conventional and may be, with the exception of tuner control unit 3 and channel selector 7, formed in the same manner as corresponding portions of television receivers utilizing RCA color television chassis of the CTC-115 type manufactured by RCA Corporation, Indianapolis, Ind. and described in the RCA Service Data for the CTC-115 chassis, File 1981, C-4. In CTC-115 chassis tuner control unit comprises a number of parallel connected potentiometers across which is coupled to a supply voltage, the wiper of each potentiometer being adjusted to provide the proper tuning voltage magnitude for a corresponding channel, and channel selector 7 comprises a rotary tuning mechanism for selectively coupling one of the wipers of the tuning potentiometers to tuner 5 to select a desired channel. However, in the present arrangement channel selector 7 comprises a calculator-like keyboard by which a user can enter the two-digit channel number corresponding to the selected channel by sequentially entering the tens and units digits and tuner control unit 3 comprises a converter, such as a phase locked loop, for converting binary coded decimal (BCD) signals representing the tens and units digit of the channel number generated by channel selector 7, to the tuning voltage with a magnitude corresponding to the selected channel. An arrangement of this type is described in U.S. Pat. No. 4,361,907 issued in the name of C. M. Wine on Nov. 30, 1982 and details of a phase locked loop suitable for use in this arrangement are provided in U.S. Pat. No. 4,357,632 issued in the name of M. P. French on Nov. 2, 1982.

The receiver shown in FIG. 1 also includes apparatus for displaying the channel number of the selected channel on the screen of picture tube 17. Specifically, the BCD signals representing the tens and units digits of the channel number generated by channel selector 7 are coupled to respective groups of four terminals R4-R7 and K of a microprocessor 23. By way of example, microprocessor 23 may comprise a type 8841 integrated circuit available from FUJITSU Limited of Tokyo, Japan and the terminals indicated in FIG. 1 correspond to that integrated circuit although it will be appreciated that other microprocessors may be employed. Microprocesor 23 generates character signals at a terminal S0 representing horizontal slices of the channel number to be displayed during corresponding horizontal scanning intervals. The character signals are coupled to a NPN switching transistor 25 which provides corresponding signals of suitable polarity and amplitude for rendering the drivers of driver unit 15 conductive so as to display white channel numbers. Specifically for use in RCA CTC-115 chassis, switching transistor 25 provides negative-going pulses for tuning the drivers "on" in response to positive-going pulses provided at terminal S0. In the absence of a positive-going pulse at terminal S0, a positive voltage very near the supply voltage (e.g., +5 volts) will be developed at the collector electrode of transistor 25. A diode 27 prevents this positive voltage from reaching the drivers and thereby affecting their operation. In order to properly position the channel number on the screen, the operation of microprocessor 23 must be synchronized with the horizontal and vertical rate signals produced by deflection unit 19. The manner in which this is accomplished will now be described.

Microprocessor 23 operates in accordance with instructions of a program stored in a read only memory (ROM) 29. A central processing unit (CPU) 31 addresses memory locations of ROM 29 to retreive (read) the instructions and thereafter executes these instructions e.g., to process data. A random access memory (RAM) 33 is used to temporarily store data. An instruction requires one or more instruction cycles depending on the instruction. The instruction cycles occur in timed relationship to timing pulses generated by a timing unit 35 in response to clock pulses of a clock signal generated by a clock oscillator 37. As will be explained below, by controlling the phase and frequency of the clock signal, the operation of microprocessor 23 is brought into synchronism with the horizontal rate signals generated by deflection unit 19. An input/output (I/O) bus 39 couples data between CPU 31 and terminals of the integrated circuit in which microprocessor 23 is incorporated. A serial shift register (SR) 41 receives data in parallel form from CPU 31 through I/O bus 39 and, when enabled to do so, couples the data at the instruction cycle rate to terminal S0. The latter is used in the formation of on-screen channel numbers as will be described below.

Clock generator 37 includes an inverting amplifier 43 in the form of a logic "inverter" included within the integrated circuit embodying microprocessor 23. Inverter 43 has an input and an output connected to respective terminals EX and X of the integrated circuit. To complete clock generator 37, a frequency determining network 45 including a capacitor 47 and a variable resistor 49 is connected in a feedback path between the input and output of inverter 43 through terminals EX and X. Such a clock signal generator is commonly employed.

The values of capacitor 47 and resistor 49 are selected so that a predetermined integer number of instruction cycles occur at the horizontal scanning rate. By way of example, if the clock signal has a nominal frequency of 2 mHz, which is the maximum clock frequency for the Fijitsu 8841 microprocessor, the instruction cycles will have a 3 microsecond duration. Thus, 20 instruction cycles will occur every 60 microseconds which is near to the 63 microsecond horizontal interval of the NTSC system employed in the United States. For the purpose of providing on-screen characters with the highest resolution in the horizontal direction, it is desirable to use the highest clock frequency possible.

Microprocessor 23 is programmed, i.e., its instructions are arranged, so that for each group of the predetermined number of instruction cycles, microprocessor 23 produces a comparison pulse at a terminal R0. The frequency and phase of the comparison pulse produced at terminal R0 is compared with that of a horizontal rate signal produced by deflection unit 19 in a phase and frequency comparator 51. The error signal produced by comparator 51 representing the phase and frequency deviations between the comparison pulse and the horizontal rate signal, is filtered by a low pass filter 53 to produce a control signal. The control signal is coupled through terminal EX to the input of inverter 43 and by modifying the bias of inverter 43 causes the adjustment of the phase and frequency of the clock signal and thereby the timing of the instruction cycles of microprocessor until the comparison signal is aligned with the horizontal rate signal. As a result, since the instruction cycles occur in timed relationship with the horizontal rate signal, the operation of microprocessor 23 is synchronized with the horizontal rate signal. In essence, in the present arrangement, selecting the predetermined number of instruction cyclces is like selecting the division factor of a frequency divider in a phase locked loop so that the phase and frequency of the output signal of a controlled oscillator, which has its frequency divided by the frequency divider, can be compared to a reference signal.

Thus, the instructions of the program of microprocessor 23 can be arranged to perform a given operation such as sampling the video signal or producing a character at a predictable place in a horizontal scanning line. Such a character generation operation will be described in greater detail below.

More specifically with respect to the synchronization apparatus, comparator 51 is a coincidence detector comprising a "wired" AND gate constructed as follows. Output terminal R0 is connected to a circuit node 55. With reference to waveform A of FIG. 2, the horizontal flyback (HFB) pulses are negative-going horizontal pulses 201 generated at the horizontal rate. The HFB pulses are coupled to the base of a NPN switching transistor 57. The collector of transistor 57 is also connected to node 55.

Under program control, as will be explained below, microprocessor 23 can drive terminal R0 and thereby node 55 to a low level. Node 55 is also driven to the low level when transistor 57 is rendered conductive in response to the positive level of the horizontal flyback signal. Node 55 is at a high level when neither microprocessor 23 or transistor 57 drives it to the low level. If, assuming for the moment that terminal R0 is not being driven to the low level by microprocessor 23, positive-going pulses 203, having durations substantially equal to the duration of the horizontal flyback pulses, are developed at node 55 in response to respective negative-going horizontal flyback pulses as is indicated by waveform B of FIG. 2.

The comparison signal generated at terminal R0 comprises transitions 205 from high levels 207 to low levels. The control signal of clock oscillator 37 generated by comparator 51 controls the phase and frequency of the clock signal so as to bring transitions 205 into alignment with respective centers of positive-going horizontal rate pulses 203 as is indicated in waveform C of FIG. 2. In that case, the signal represented by waveform D having positive-going pulses a width substantially equal to one-half the width of pulses 203 of waveform B will be developed at node 55. The average level of the signal represented by waveform D produced by low pass filter 53 as the control signal corresponds to the correct phase and frequency of the clock signal.

Figure 2:
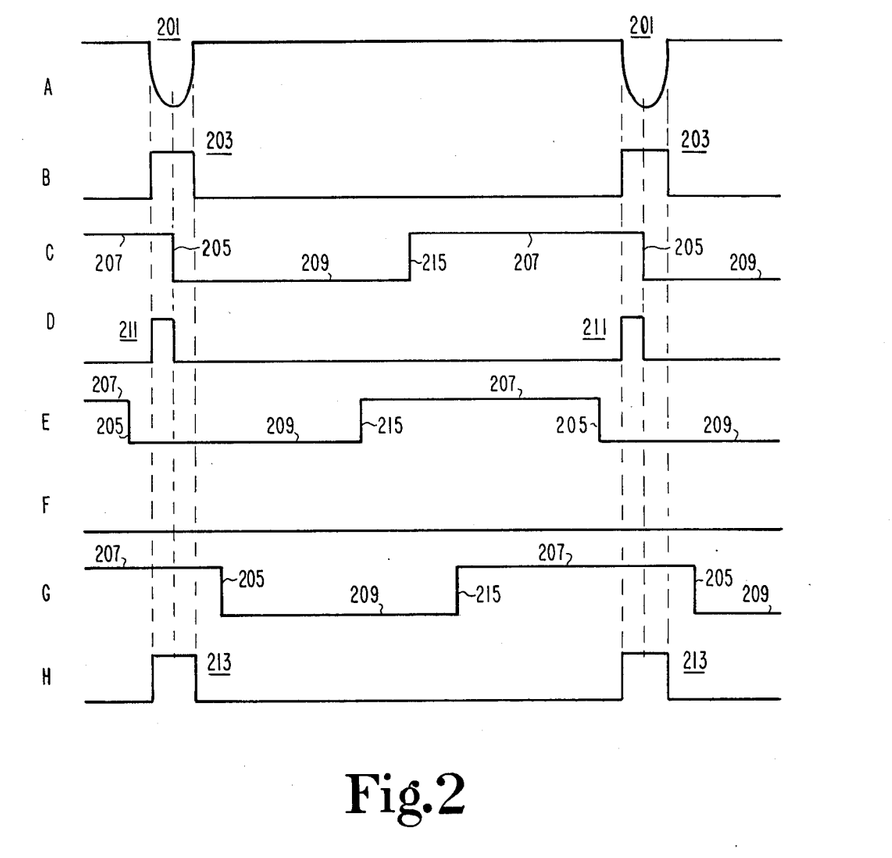
FIG. 2 is a waveform diagram helpful in understanding the operation of the synchronization apparatus shown in FIG. 1.

If transitions 205 occur prior to positive-going horizontal rate pulses 203, as indicated by waveform E, a low level will be produced at node 55 as is indicated by waveform F. In response to the low level produced at node 55, the phase and frequency of the clock signal are adjusted until transitions 205 occur during the duration of respective positive-going horizontal rate pulses 203. This causes relatively narrow pulses to be produced at node 55. Thereafter, in response to the still relatively low average level resulting from the narrow pulses, the phase and frequency of the clock signal are adjusted until the width of the narrow pulses is increased to that of pulses 211 of waveform D.

If transitions 205 occur later than positive-going horizontal rate pulses 203, as indicated by waveform G, positive-going pulses 213 wider than pulses 211 will be produced as node 55 as is indicated by waveform H. In response to the relatively high average level resulting from the relatively wide pulses, the phase and frequency of the clock signal is adjusted until the width of the wide pulses is decreased to that of pulses 211 of waveform D.

So that another negative-going transition 205 from high level 207 to low level 209 can be generated a predetermined number of instruction cycles, e.g., 20, after the last negative-going transition, the comparison signal is caused to undergo positive-going transitions 215 from low level 209 to high level 207 at a number of instruction cycles, e.g. 10, corresponding to a time midway between negative-going transitions 205. Since positive-going transitions 215 are not used for comparison purposes, their timing is not critical and the number of instruction cycles from the respective negative-going transitions 205 at which they are generated may be varied to allow programming flexibility.

Figure 3:
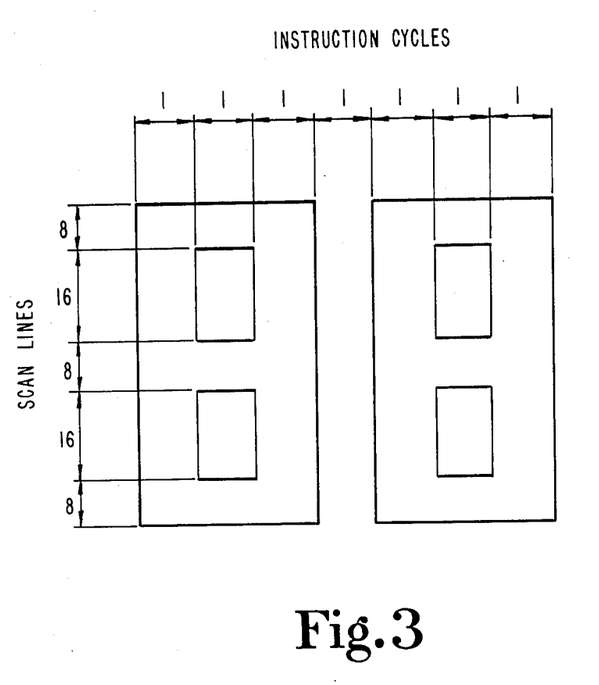
FIG. 3 is a diagram indicating the format channel numbers formed by the on-screen channel number display apparatus shown in FIG. 1 useful in understanding its operation.

Turning now to FIG. 3, the on-screen channel number operation of microprocessor 23 will now be described. In FIG. 3, by way of example, the format of channel number 88 is shown. The channel numbers are located from the top of the screen by a distance corresponding to predetermined numbers of scan lines, e.g., forty, and from the left edge of the screen by a distance corresponding to a predetermined number of instructions cycles, e.g., four. For the example given, the character will be located in the upper left-hand corner of the screen. Each character comprises five horizontal rows and three vertical columns. (Actually, the space between the characters is considered a fourth vertical column of the left character.) The rows consist of a predetermined number of horizontal scan lines as indicated. The columns each have a width which corresponds to the distance the electron beams traverse in one instruction cycle. At each horizontal scan line of a row, a slice of the channel numbers is formed by executing instructions for causing a positive-going pulse to be generated at terminal S0 with a duration corresponding to to the duration of an instruction cycle for each column in which a portion, called a "dot", of the character exists.

Figure 4:
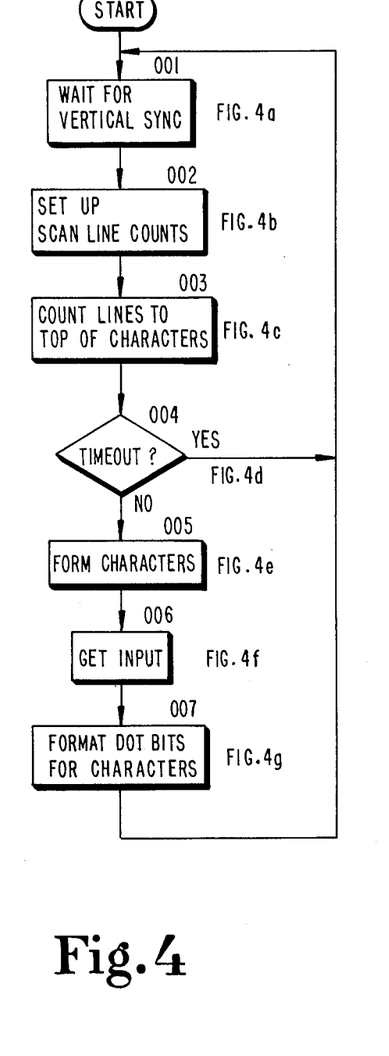
FIGS. 4 and 4a–4g are flow charts for the program for controlling the microprocessor shown in FIG. 1 for forming the on-screen channel number display.
Figure 4A:
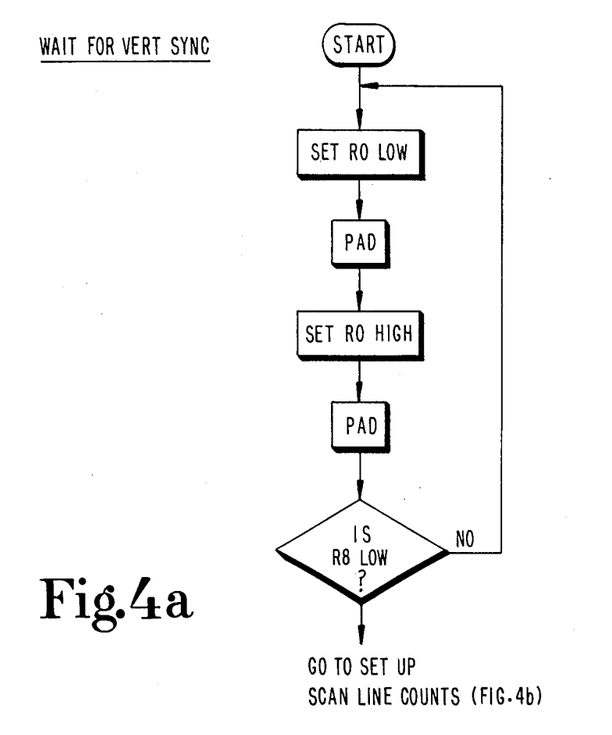

The formation of the on-screen channel numbers will be more specifically described with reference to the flow chart of the program stored in ROM 29 of microprocessor 23. FIG. 4 shows the overall sequency of the program. FIGS. 4a–4g show detailed flow charts of the various portions of the program indicated in FIG. 4. In the following description, the number indicated in parenthesis identify corresponding flow chart portions.

Before referring to the flow charts individually, some general comments which relate to the specifics of the synchronization operation will be helpful. By way of example, refer to FIG. 4c during the following discussion. The segments of the program which are sequentially executed each have the predetermined number of instruction cycles, e.g., 20, corresponding to the duration of the horizontal scanning interval and start with setting the voltage at terminal R0 to the low level (i.e., starts with the generation of the comparison signal.) If there are not enough instruction cycles in the segment, an appropriate number of no-operation (commonly referred to as NOP) instructions are executed. These portions are indicated by PAD function blocks. The same is true if the segment repeats a number of times (i.e., if a decision causes the program to return to the beginning of the same segment rather than go to the next one. In each path of a segment, the voltage at terminal R0 is set to the high level at or approximately at 10 instruction cycles after it has been set to the low level. PAD operations are used for this purpose also.

Now with reference to FIG. 4, in order to locate the channel numbers at the predetermined number of scan lines from the top of the screen, the start of the vertical trace interval must be determined (001). Specifically with respect to FIG. 4a, for this purpose microprocessor 23 repetitively samples the level at a terminal R8 to determine the start of the vertical trace interval. As shown in FIG. 1, the vertical drive signal (VDR) is coupled to the base of a NPN switching transistor 59. The collector of transistor 59 is connected to terminal R8. At the beginning of the vertical trace interval, the vertical drive signal undergoes a transition from a low level to a high level causing the signal at terminal R8 to undergo a corresponding transition from a high level to a low level.

Figure 4B:
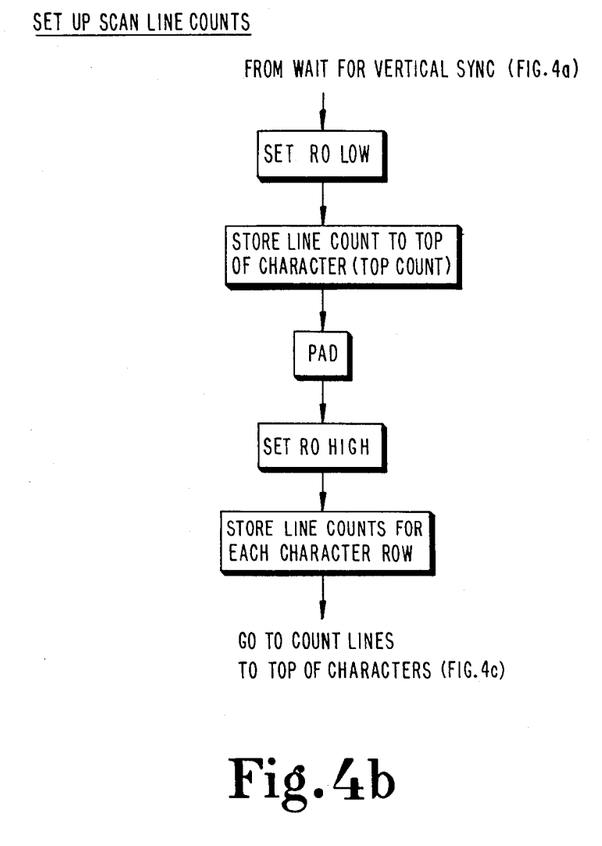

As indicated generally in FIG. 4, when microprocessor 23 has sensed the low level at terminal R8, counters (which are actually memory locations of RAM 33) are initialized to contain the number of scan line counts to the top of the characters and for each row of the characters (002). The detailed flow chart for this purpose is shown in FIG. 4b.

Figure 4C:
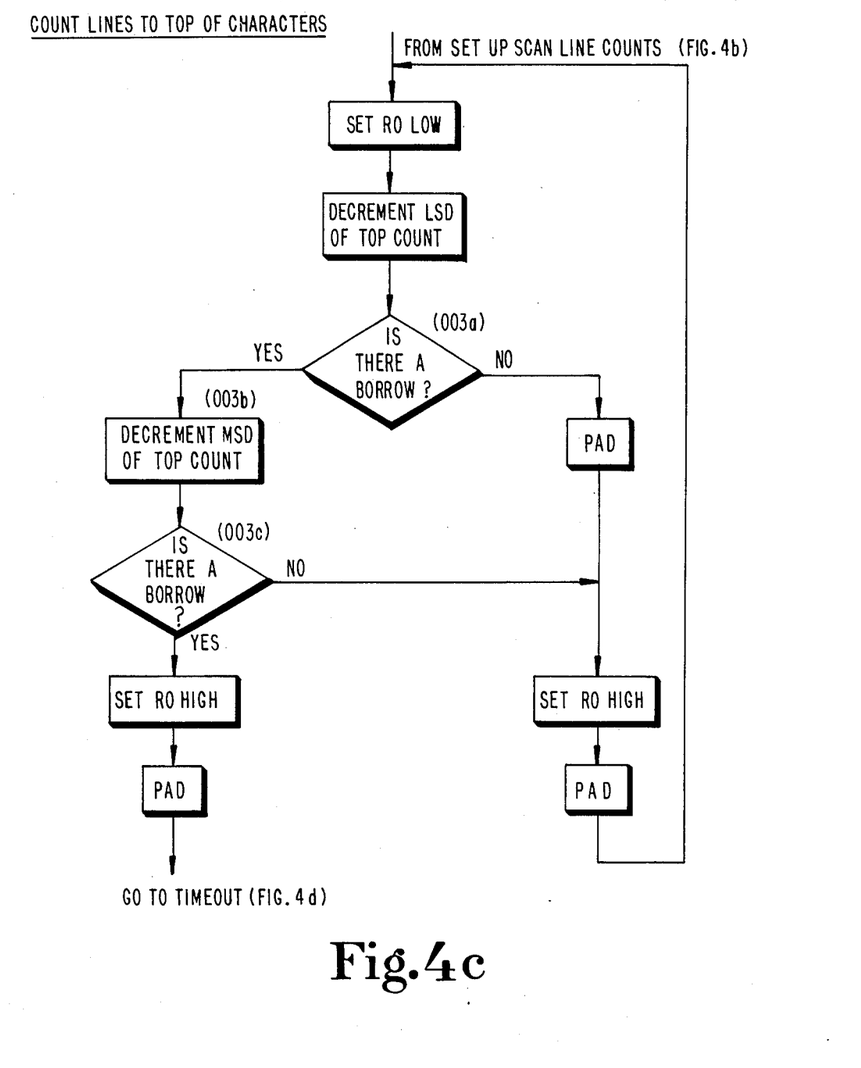
Figure 4D:
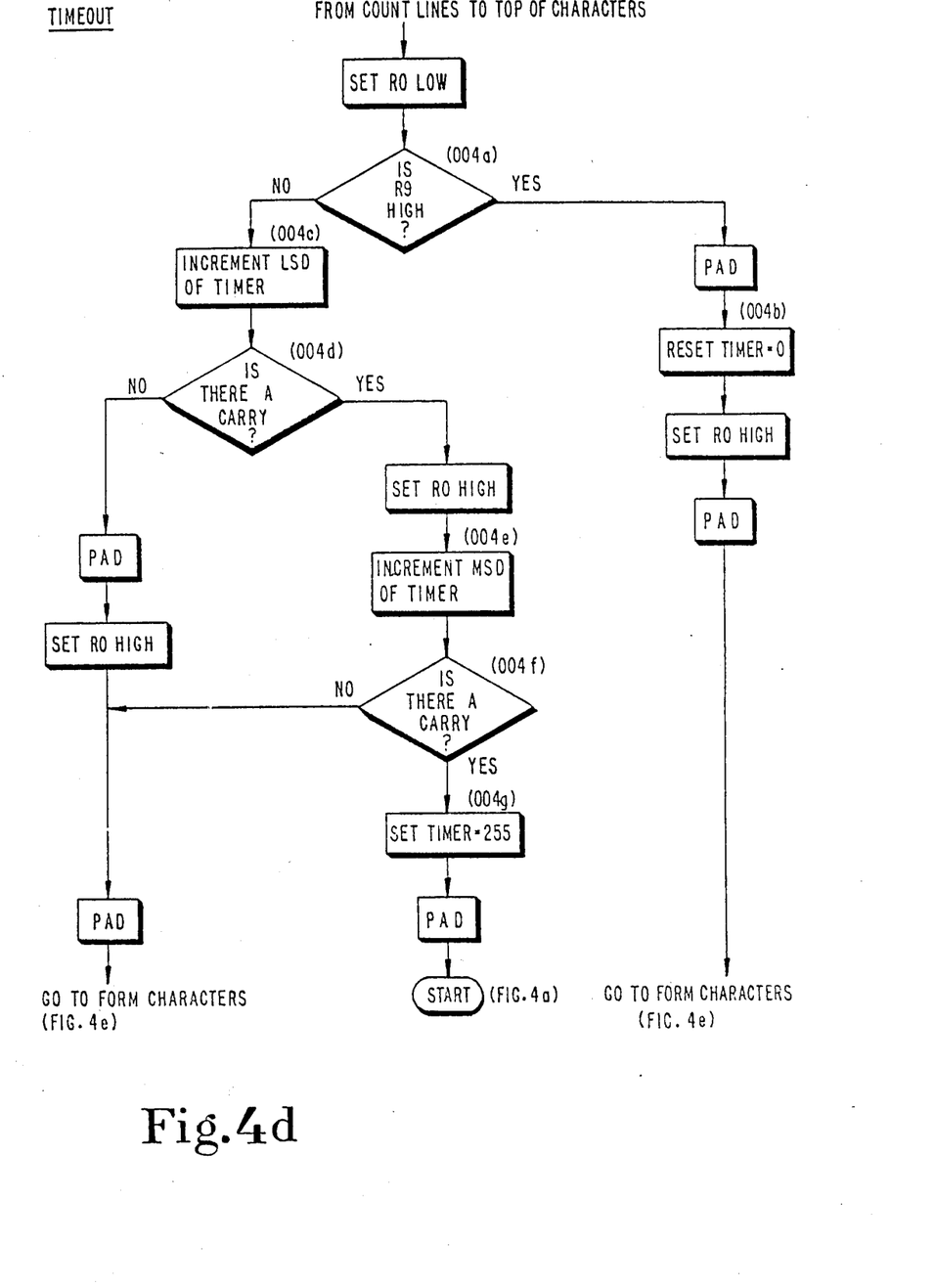

As is indicated in FIG. 4, after the scan line counts have been initialized, microprocessor 23 starts counting horizontal scan lines to determine when to start forming the top row of the character (003). Specifically, as is indicated in FIG. 4c, since the instructions which cause the generation of the comparison signal at terminal R0, which has been synchronized with the horizontal retrace signal as described above, the latter is accomplished by decrementing a counter once each time the voltage at terminal R0 is set to the low level. The count continues until a predetermined number of scan lines has been counted. (The predetermined number does not actually correspond to the top of the characters but to a higher vertical position to account for the number of scan lines traversed during an operation which occurs before the formation of the characters). As shown in FIG. 4c, since the Fijitsu MB8841 microprocessor is a four-bit microprocessor, meaning that a maximum count of sixteen can be counted using a single memory location of RAM 33, and the predetermined number of scan lines is greater than sixteen, two memory locations of RAM 33, one for the least significant or units digit (LSD) and one for the most significant or tens digit (MSD) are used. After the LSD has been decremented to the point at which a borrow is generated (003a), the MSD is decremented (003b). When the MSB has been decremented to the point at which a borrow is generated (003c), the next segment of the overall program, TIMEOUT (004) is initiated.

As indicated in FIG. 4, after the predetermined number of scan lines has been counted (003), a TIMEOUT portions is entered (004) to determine whether or not to display or to continue displaying the channel number. Specifically, with respect to the structure shown in FIG. 1, a positive-going CHANGE pulse is generated by channel selector 7 whenever the selected channel is changed. The CHANGE pulse is coupled to terminal R9 of microprocessor 23. With respect to FIG. 4d, the TIMEOUT portion of the program causes the level at terminal R9 to be sensed (004a) and if it is at the high level causes the channel number to be displayed. If the level at terminal R9 is low and a predetermined time, e.g., four seconds has not elapsed since it became low, the channel number continues to be displayed. If the level at terminal R9 is low and if the predetermined time has elapsed, the channel number is not displayed and the program returns to its beginning (START). Specifically, the elapsed time counter or timer includes a memory location of RAM 33 the contents of which are incremented until a predetermined count is reached. To provide four seconds of display time, a predetermined count of 256 requiring an eight-bit timer with an LSD and MSD portion is used. The timer is set to a count of zero (004b) when terminal R9 is initially determined to be at the high level. When voltage at terminal R9 is no longer at the high level, in each field (the program returns to its beginning after displaying the characters), the LSD of the timer is incremented once (004c) and thereafter the characters are caused to be displayed and the program returns to its beginning as will be described below. This process continues until a carry is generated (004d). After a carry has been generated for the LSD, in each field, the MSD of the timer is incremented once (004e) and thereafter the characters are caused to be displayed and the program returns to its beginning. This process continues until a carry for the MSD is generated (004f) After a carry is generated for the MSD, indicating that the predetermined time has elapsed (i.e., a count of 256 at the field rate of 60 hz approximately corresponds to 4 seconds), the characters are not displayed and the program returns to its beginning (START). In the latter event, before the program returns to its beginning, the timer is set to a count of 255 (004g) so that a carry will be generated during the next field and, accordingly, the characters will not be displayed.

Figure 4E:
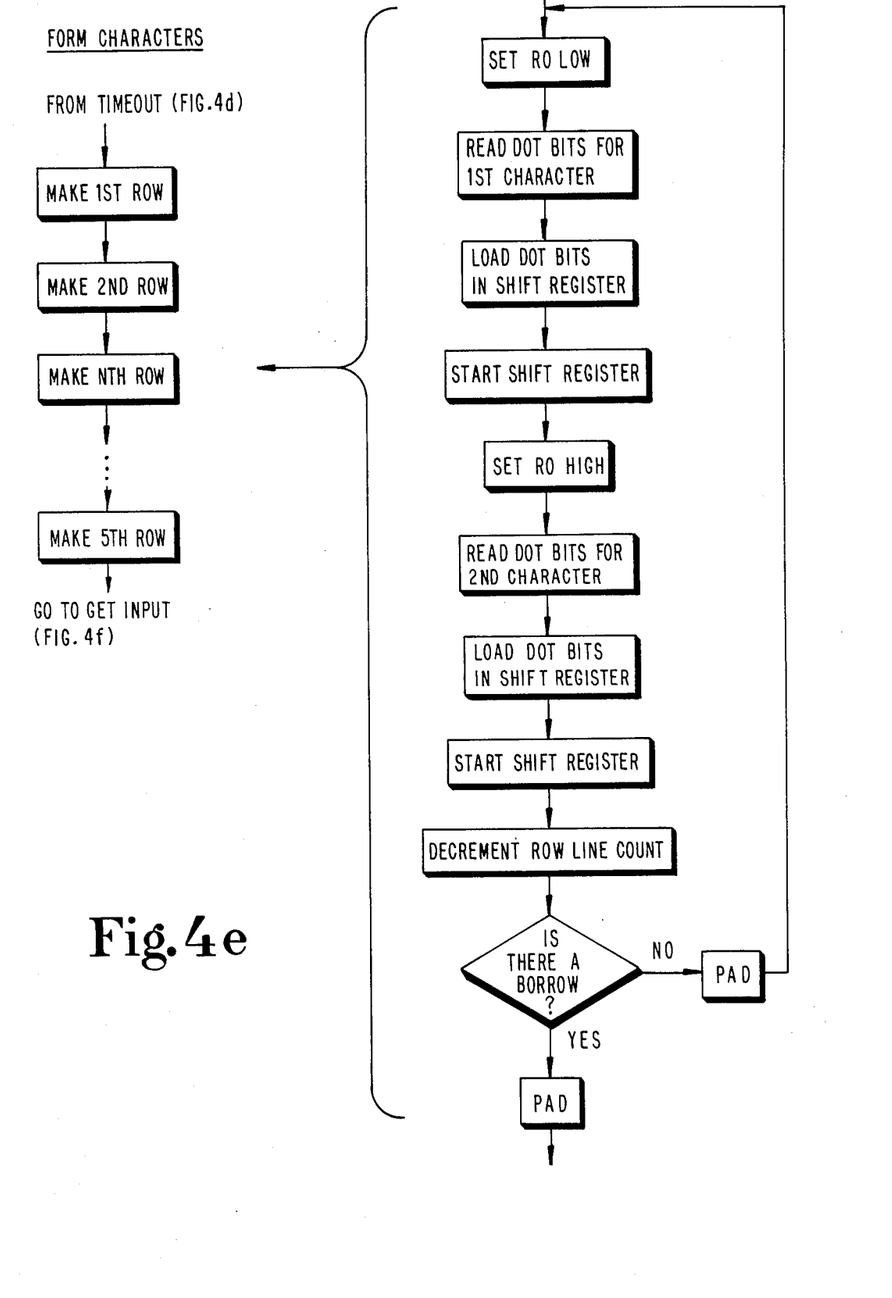
Figure 4F:
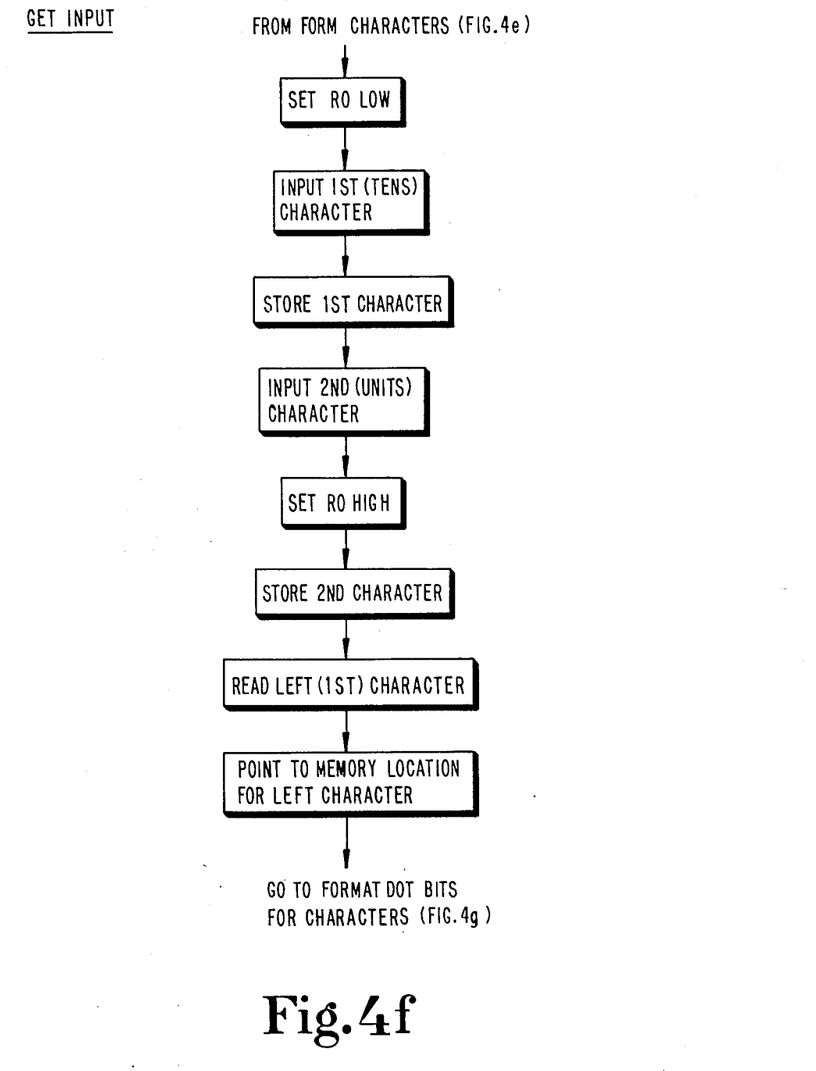
Figure 4G:
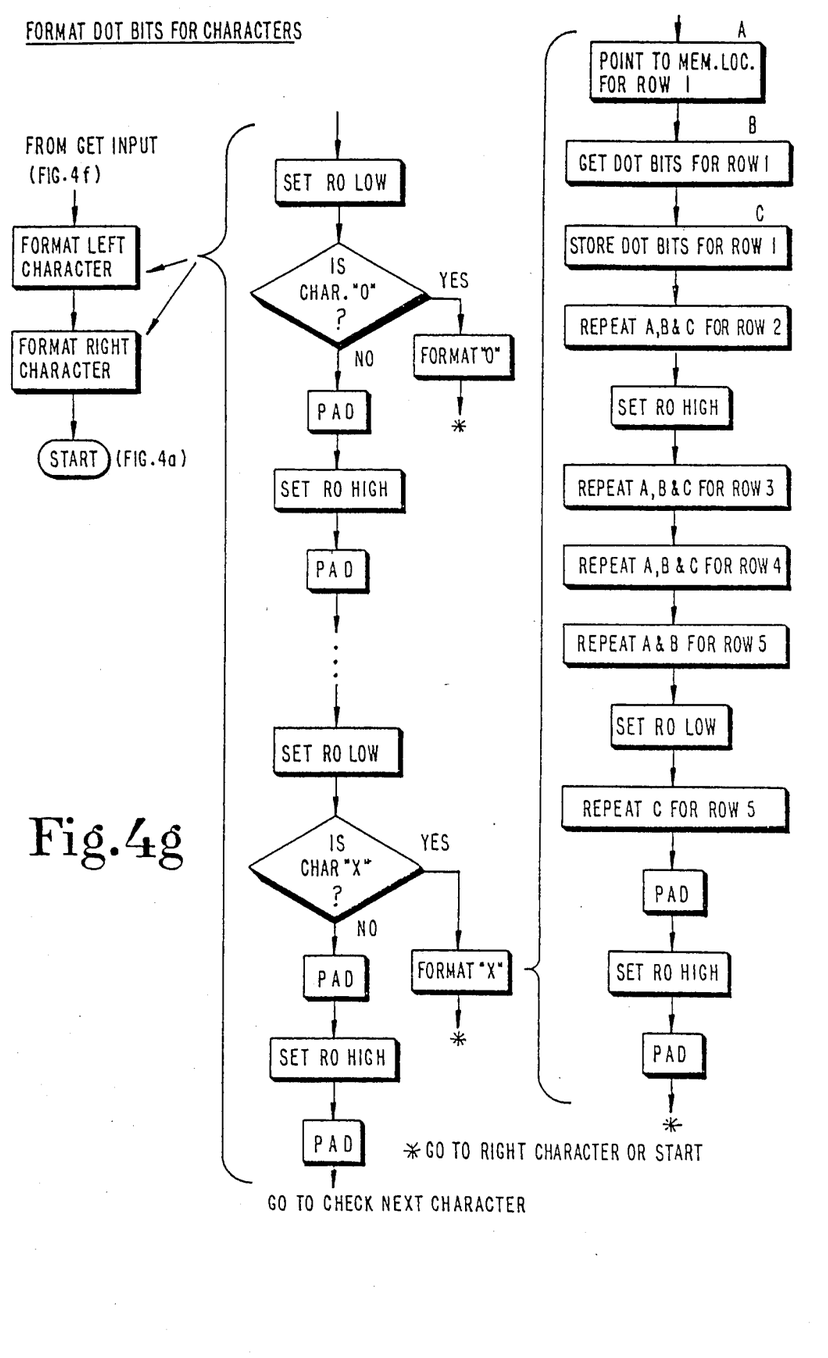

In the next portion of the overall program shown in FIG. 4, the characters are formed (005). The dot pattern for each row of each characters is determined by the program stored in ROM 29. As will be described below, when a channel number is entered, the dot pattern for each row of the two digits of the channel number is stored in a respective memory location of RAM 33 of microprocessor 23. Each dot is represented by a respective bit. As is indicated in FIG. 4e, in each scan line of a particular row, the dot bits are read out of the memory location for the row and coupled in parallel form to shift register 41. Thereafter shift register 41 is enabled to couple each dot bit to terminal S0 in serial fashion at the instruction cycle rate. This process is repeated for each line of each row and for each row until the character display is completed.

As indicated in FIG. 4, after the characters have been formed, the BCD signals tens and units digits of the channel number are entered and stored (006). Specifically, with reference to FIG. 4f, the tens and units digits are entered and stored in sequence. Since the units digit is stored last and the tens digit is to be formed first, the memory location for the tens digit is identified or "pointed to" in preparation for the character formatting portion of the program.

In the formatting portion of the program (007) indicated in FIG. 4, the dot bit for each row of the entered characters are formatted so that the characters can be formed as indicated above. Thereafter the program returns to its beginning (START). Specifically, with respect to FIG. 4g, the left character (i.e., tens digit) and then the right character (i.e., units digit) are formatted. Once the particular character entered has been identified, each of its rows formated according to the programmed codes and stored in a corresponding memory location for recall during the formation of the character as described above.

While the purpose of synchronizing the operation of microprocessor 23 with the synchronization signals generated by deflection unit 19 is to enable microprocessor 23 to generate an on-screen character display, in the absence of a properly tuned RF signal for a selected channel, the composite synchronization signal provided by picture processing unit 13 contains noise components rather than proper horizontal and vertical synchronization components. Under these conditions, because deflection unit 19 will respond to the noise components, the characters will be distorted (i.e., tear at their horizontal edges.

More specifically, deflection unit 19 includes a phase locked loop which synchronizes an oscillator having a frequency which is a multiple of the horizontal rate with the horizontal synchronization component of the composite synchonization signal. The output signal of the oscillator is coupled to a counting arrangement which produce the horizontal and vertical drive signals from which the horizontal and vertical deflection signals are generated at appropriate counts. Normally, the counting arrangement is reset in response to the vertical synchronization component to produce the vertical drive signal. However, should the vertical drive signal be absent or not exhibit the proper condition the counting arrangement will be reset to a predetermined count corresponding to the number of horizontal scanning lines in the visible portion of a field, e.g., 525, to produce the vertical drive signal. The purpose of such a counting arrangement is to make the generation of the deflection signals relatively immune to noise. Such a counting arrangement is described in detail in U.S. Pat. No. 3,878,335 issued in the name of A. R. Balaban on Apr. 15, 1975 and U.S. Pat. No. 4,251,833 issued in the names of R. E. Fernsler and D. H. Willis on Feb. 17, 1981.

While such a deflection unit is effective to reduce the susceptbility of the deflection signals to noise, it has been found that in the absence of a properly tuned RF signal, the phase locked loop will respond to noise components to initially alter the frequency of the oscillator thereby causing the distortion of the displayed channel numbers.

Inasmuch as it is desirable to provide a display of the channel number of a newly selected channel during the tuning operation when the RF signal has not yet been properly tuned, the arrangement shown in FIG. 1 includes provisions for substituting a stable horizontal rate synchronization signal for the one provided from picture processing unit 13 when a properly tuned RF signal is absent. For this purpose, the output signal of a synchronization signal (sync) validity detector 61, coupled to tuner control unit 5 to incrementally change the frequency of the local oscillator of tuner and IF section 3 until a properly tuned RF signal is obtained in the manner set forth in the aforementioned French patent, is coupled to a convenient terminal indicated as 63 of microprocessor 23. Sync validity detector 61 evaluates the composite synchronization signal provided by picture processing unit and provides a high level when the composite synchronization signal exhibits the correct characteristics and a low level when the composite synchronization signal does not exhibit the correct characteristic. At a convenient point in the program, e.g., just after TIMEOUT portion, 004 indicated in FIG. 4, the level at terminal 63 is examined. If the level is high, indicating a correct composite synchronization signal, the program continues as described above, i.e., portions 005–007 are performed. However, if the level is low, indicating an incorrrect composite synchronization signal, an auxiliary path of the program is substituted for the path including portions 001–007. The auxiliary path is substantially the same as that including portions 001–007 except that at the points where terminal R0 is set to the low level, a positive-going pulse is generated at a convenient terminal indicated as 65. Since R0 is normally set to the low level at the horizontal rate, the pulses generated at terminal 65 will also be generated at the horizontal rate (noting that the frequency of clock oscillator 37 will change very little from its nominal frequency). The pulses generated at terminal 65 are coupled through an isolation diode 67 to a horizontal synchronization input (H) of the phase locked loop of deflection unit 19 and thereby causes the oscillator of deflection unit 19 to oscillate stably at its nominal frequency.

It is noted that positive pulses generated at terminal 65 during the auxiliary section of the program are formed by setting terminal 65 to the high level in one instruction cycle and then setting it to the low level in the next instruction cycle. However, since it is not necessary to set terminal R0 first to the low level and then to the high level approximately 10 instruction cycles latter, the same predetermined number of instruction cycles, e.g., 20, will be used in each section of the program.

Other modifications to the described embodiment may be made. For example, a black surround may be provided for the channel numbers to make them more visible. In addition, other characters including letter and symbols may be formed in the same way. In addition, it will be appreciated that while the character generation arrangement has been described as being incorporated in a television receiver including a picture tube, it may also be incorporated in a television accessory such as a video cassette recorder which does not itself include a picture tube but produces television signals for displaying an image by means of a picture tube incorporated in an associated television receiver or monitor. In that case, the character signals produced by a character generation arrangement as described above incorporated in the accessory can be coupled to the television receiver or monitor together with the television signal produced by the accessory, e.g., by modulation of the combined signal on to the RF carrier of an unused channel. It will be also appreciated that the described synchronization structure may be used for purposes other than for forming an on-screen character display such as for sampling the video signal at a given point in a horizontal line. These and other modifications are contemplated to be within the scope of the present invention defined by the following claims.

What is claimed is:

1. Apparatus comprising:
   computing means operating in response to stored program instructions generated in timed relationship to instruction cycles occurring at a rate synchronously related to a clock signal;
   clock signal generating means for generating said clock signal and for controlling the phase and frequency of said clock signal in response to a control signal;
   a source of a reference frequency signal having a reference frequency;

said computing means being programmed to generate a comparison signal each time a predetermined number of instruction cycles have occurred; and comparison means for comparing the phase and frequency of said comparison signal and said reference signal and generating said control signal in response thereto.

2. The apparatus recited in claim 1, wherein:

the frequency of said clock signal is nominally an integer multiple of said reference frequency; and said predetermined number of instruction cyclces is selected so that the frequency of said comparison signal is nominally equal to said reference frequency.

3. The apparatus recited in claim 1, wherein:

the generation of said comparison signal is marked by a first transition from a first level to a second level and the termination of said comparison signal is marked by a second transition from said second level to said first level which occurs a number of instruction cycles approximately equal to one-half said predetermined number of instruction cycles have occurred after said first transition.

4. The apparatus recited in claim 1, wherein:

said computing means comprises a microprocessor embodied in an integrated circuit;

said clock signal generating means comprises an amplifying device included within said integrated circuit having an input and an output connected to respective terminals of said integrated circuit, and a frequency determining network external to said integrated circuit connected in a feedback network between said input and output of said amplifying device through said terminals; and said comparison means includes a coincidence detector for generating a pulse at a circuit point when said comparison signal and said reference signal are coincident, and filter means coupled between said circuit point and one of said terminals.

5. The apparatus recited in claim 4, wherein:

said coincidence detector comprises a wired AND function gate.

6. The apparatus recited in claim 1, wherein:

said source of reference frequency signals comprises a source of television horizontal rate signals.

7. In a television system, apparatus comprising:

computing means operating in response to program instructions generated in timed relationship to instruction cycles occurring at a rate synchronously related to a clock signal;

clock signal generating means for generating said clock signal and for controlling the phase and frequency of said clock signal in response to a control signal;

a source of a television horizontal rate signal defining the rate at which horizontal scanning intervals occur;

said computing means being programmed to generate a comparison signal each time a first predetermined number of instruction cycles have occurred;

comparison means for comparing the phase and frequency of said comparison signal and said horizontal rate signal and generating said control signal in response thereto; and said computing means being programmed to perform a predetermined operation at a second predetermined number of instruction cycles after the generation of said comparison signals in any of said scanning intervals.

8. The apparatus recited in claim 7, wherein:

the frequency of said clock signal is nominally an integer multiple of the frequency of said horizontal rate signal; and,.

said first predetermined number of instruction cycles is selected so that the frequency of said comparison signal is nominally equal to the frequency of said horizontal rate signal.

9. The apparatus recited in claim 7, wherein:

the generation of said comparison signal is marked by a first transition from a first level to a second level and the termination of said comparison signal is marked by a second transition from said second level to said first level which occurs a number of instruction cycles approximately equal to one-half said first predetermined number of instruction cycles have occurred after said first transition.

10. The apparatus recited in claim 7, wherein:

there is further provided a source of a television vertical rate signal; and said computing means is programmed to be responsive to said vertical rate signal for counting the number of times said comparison signal is generated after the occurrence of said vertical rate signal.

11. The apparatus recited in claim 10, wherein:

there is further provided a source of data signals corresponding to a character; and said computing means is responsive to said data signals for generating character pulses at a rate proportional to said rate of said instruction cycles for forming slices of said character at corresponding counts of said comparison signal; and coupling means for coupling said character pulses to image display devices associated with said television system.

12. The apparatus recited in claim 7, wherein:

said computing means comprises a microprocessor embodied in an integrated circuit;

said clock signal generating means comprises an amplifying device included within said integrated circuit having an input and an output connected to respective terminals of said integrated circuit, and a frequency determining network external to said integrated circuit connected in a feedback network between said input and output of said amplifying device through said terminals; and said comparison means includes a coincidence detector for generating a pulse at a circuit point when said comparison signal and said horizontal rate signal are coincident, and filter means coupled between said circuit point and one of said terminals.

13. The apparatus recited in claim 12, wherein:

said coincidence detector comprises a wired AND function gate.

14. Apparatus comprising:

a microprocessor embodied in an integrated circuit and operating in response to programmed instructions generated in timed relationship to instruction cycles occurring at a rate synchronously related to a clock signal;

clock signal generating means for generating said clock signal and for controlling the phase and frequency of said clock signal in response to a control signal, said clock signal generating means comprising an amplifying device included within said integrated circuit having an input and an output connected to first and second terminals of said integrated circuit, respectively, and a frequency determining network connected in a feedback network between said input and said output of said amplifying device through said terminals;

a source of a reference frequency signal having a reference frequency;

said microprocessor being programmed to generate a comparison signal at a third terminal of said integrated circuit each time a predetermined number of instruction cycles have occurred; and coincidence detector means coupled to said source and said third terminal for generating a pulse at a circuit point when said reference frequency signal and said comparison signal are coincident; and filter means coupled between said circuit point and said first terminal.

15. The apparatus recited in claim 14, wherein:

the frequency of said clock signal is nominally an integer multiple of said reference frequency; and said predetermined number of instruction cycles is selected so that the frequency of said comparison signal is nominally equal to said reference frequency.

16. The apparatus recited in claim 14, wherein:

the generation of said comparison signal is marked by a first transition from a first level to a first level and the termination of said comparison signal is marked by a second transition from said second level to said first level which occurs a number of instruction cycles approximately equal to one-half said predetermined number of instruction cycles after said first transition.

17. The apparatus recited in claim 14, wherein:

said amplifying device comprises an inverter.

18. The apparatus recited in claim 14, wherein:

said coincidence detector comprises a wired AND function gate.

19. The apparatus recited in claim 14, wherein:

said source of reference frequency signals comprises a source of television horizontal rate signals.

20. The apparatus recited in claim 19, wherein:

there is further provided a source of a television vertical rate signal; and said computing means is programmed to be responsive to said vertical rate signal for counting the number of times said comparison signal is generated after the occurrence of said vertical rate signal.

21. The apparatus recited in claim 20, wherein:

there is further provided a source of data signals corresponding to a character; and said computing means is responsive to said data signals for generating character pulse at a rate proportional to said rate of said instruction cycles for slices of said character at corresponding counts of said comparison signal.

22. In a television system for forming an image on an image display device which is scanned in lines during line scanning intervals, apparatus comprising:

a microprocessor embodied in an integrated circuit and operating in response to programmed instructions generated in time relationship to instruction cycles which occur in time relationship to a clock signal;

clock signal generating means for generating said clock signal and for controlling its phase and frequency in response to a control signal;

a source of a television synchronization signal defining the rate at which said line scanning intervals occur;

synchronization means responsive to said clock signal and to said television synchronization signal for generating said control signal so as to synchronize said clock signal and thereby said instruction cycles with said television synchronization signal;

a source of data signals corresponding to a character;

said microprocessor being programmed for generating character pulses at a rate proportional to that of said instruction cycles during ones of said line scanning intervals;

coupling means for coupling said character pulses to said image display device, said image display device being responsive to said pulses to display slices of said character.

23. The apparatus recited in claim 22, wherein:

said synchronization means includes comparison means for comparing the phase and frequency of a comparison signal generated by said microprocessor and said television synchronization signal to generate said control signal, said microprocessor being programmed to generate said comparison signal each time a predetermined number of instruction cycles have occurred;

there is further provided detection means for detecting when said television synchronization signal is improper;

said microprocessor is programmed to be responsive to the detection of an improper television synchronization signal for providing a substitution synchronization signal including a pulse generated each time said predetermined number of instruction cycles have occurred; and there is further provided substitution means for substituting said substitution synchronization signal for said television synchronization signal.

* * * * *